2,991,280
METALLISABLE MONOAZO DYESTUFFS AND THE COMPLEX HEAVY METAL COMPOUNDS THEREOF
Guido Schetty, Fabio Beffa, and Werner Kuster, Basel, Switzerland, assignors to J. R. Geigy A.-G., Basel, Switzerland, a Swiss firm
No Drawing. Filed June 25, 1956, Ser. No. 593,374
Claims priority, application Switzerland July 15, 1955
4 Claims. (Cl. 260—151)

The invention is concerned with new, metallisable monoazo dyestuffs, the complex heavy metal compounds thereof, processes for their production and their use for the fast dyeing of natural and synthetic polypeptide fibres, as well as of leather.

In the monoazo dyestuffs containing heavy metal and having no sulphonic acid groups which have attained great importance for the fast dyeing of natural and synthetic polypeptide fibres, up to now all the substituents used to increase the water solubility have been alkyl sulphonyl or sulphonic acid amide groups, preferably derived from hexavalent sulphur.

It has now been found that also acylated, secondary amino groups which, unlike the sulphonic acid amide groups used up to now, contain no acid hydrogen atom at the nitrogen atom of the amido group, play a part in increasing the water solubility in metallised unsulphonated monoazo dyestuffs to such an extent that these can be dyed onto polypeptide fibres from aqueous dyebaths. They increase the levelling power in unsulphonated monoazo dyestuffs containing heavy metal which contain the substituents which have been usual up to now to increase the water solubility.

According to the present invention, the new metallisable monoazo dyestuffs and the complex heavy metal compounds thereof are obtained if a diazotised aminoaryl compound A—NH$_2$, wherein A represents an aromatic radical which may possibly be further substituted, which in the neighbouring position to the amino group contain a metallisable group, e.g. a hydroxyl, carboxyl or a sulphamide group or a substituent which can be converted into such a group, e.g. a carboxylic acid ester group, an alkoxy group or a mobile halogen atom, is coupled with an azo component B—H coupling in the neighbouring position to a metallisable group, the components being so chosen that at least one of the two contains an acylated, secondary amino group and neither contains an acid water solubilising group not taking part in the complex formation. The new dyestuffs correspond to the general formula:

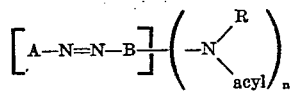

wherein
A and B have the meanings given above,
R represents an alkyl or cycloalkyl group,
"acyl" represents an organic acyl radical, and
n is a whole number from 1 to 2.

The property of the acylated secondary amino group which brings about the water solubility is particularly pronounced if R represents a low alkyl group, e.g. the ethyl group and, preferably, the methyl group, and if the acyl radical is derived from a low aliphatic monocarboxylic acid or monosulphonic acid. The acetyl and methyl sulphonyl radicals are particularly favourable in this respect. Also the ethyl sulphonyl or the β-chlorethyl sulphonyl radical can be used. Higher fatty acid and alkyl sulphonyl radicals and also benzoyl, furoyl and aryl sulphonyl radicals as well as higher alkyl and cycloalkyl radicals strongly reduce the water solubility. Monoazo dyestuffs containing heavy metal according to the present invention with such groups can only be used for the dyeing of lacquers if the usual alkyl sulphonyl or sulphonic acid amide groups are not present; if however, they are present, then water soluble dyestuffs having a relatively good levelling power are obtained.

These monoazo dyestuffs according to the present invention can be converted by methods known per se in substance and, insofar as they are sufficiently water soluble to be dyed, also on the fibre, into the complex heavy metal compounds, e.g. into the copper, nickel, manganese, iron and preferably, the chromium or cobalt compounds. To metallise on the fibre, the after chroming of the wool dyeing with alkali salts of chromic acids in an acid bath is suitable; however, the so-called single bath chroming method, that is the dyeing of the wool in a neutral to weakly acid bath while reducing the pH value of the liquor in the presence of chromic acid alkali salts is to be preferred. The metallisation in substance is performed by methods known per se in aqueous or organic solution or suspension with the simple or complex salts of the metals listed as agents giving off metal. The metallisation is performed in the warm. Lower alcohols such as ethanol, propanols, ethylen glycol, ethylene glycol monomethyl, -ethyl or -butyl ether, or fatty acid amides such as formamide, acetamide or dimethyl formamide are examples of organic solvents which can be used.

Particularly valuable for the dyeing of natural and synthetic polypeptide fibres such as wool, silk, Lanital, superpolyamide and superpolyurethane fibres are the complex chromium and cobalt compounds of the new, water soluble dyestuffs and, of these, particularly those which contain 2 molecules of organic complex-former of which at least one molecule must be a water soluble dyestuff according to the present invention, bound to a co-ordinative hexavalent heavy metal atom. Those complex chromium and cobalt compounds which contain 2 molecules of the same water soluble monoazo dyestuff according to the present invention co-ordinated to one heavy metal atom are to be preferred. They are obtained by reacting simple or complex salts of chromium or cobalt such as chromic acetate, chromosalicyclic acid alkali salts, cobalt sulphate, cobalt nitrate, cobalt acetate or hexammine cobaltichloride with aqueous solutions or suspensions of the water soluble dyestuffs according to the present invention, if at least one molecule of metal salt is made to act upon two dyestuff molecules, the reaction being performed in a neutral to alkaline medium in the warm. In dystuffs which contain only one molecule of dyestuff according to the present invention, the second organic complex-former can be another metallisable monoazo dyestuff or an uncoloured compound, e.g. an aromatic o-hydroxy-carboxylic acid which may possibly be further substituted. Such mixed chromium complexes are obtained by a known method from the metal complexes which contain one dyestuff molecule bound to a metal atom by adding the other metallisable dyestuff or an aromatic o-hydroxycarboxylic acid compound. The metal complexes above mentioned are produced in an organic medium in the presence of mineral acid with an excess of chromic salt. Naturally, also mixtures of different water soluble dyestuffs according to the present invention or mixtures of these with other unsulphonated metallisable monoazo dyestuffs can be metallised to obtain mixed metal complex compounds in a mixture with the symmetrical compounds. Finally the chroming can also be performed by a method which again is known by reacting in the warm the aqueous solutions or suspensions of the dyestuffs according to the present invention or mixtures of such with other metallisable monoazo dyestuffs, with alkali salts of chromic acids, the reaction being performed in the presence of reducing sugar. The chromium and cobalt containing dyestuffs suitable for wool dyeing from an aqueous bath are used advantageously in the form of their alkali salts, e.g. as the lithium, sodium, potassium or ammonium salts. These salts are obtained in the metallising process in the presence of the respective bases or of salts of these alkalies having a basic action, for example the carbonates or tri-alkali phosphates. The metallised dyestuffs may possibly be mixed also with slight amounts of basic salts; also it is often of advantage for the dyeing behaviour of the water soluble wool dyestuffs containing metal according to the present invention to mix them with anion active wetting and dispersing agents or with formaldehyde condensation products of naphthalene sulphonic acids.

In the dyestuffs according to the present invention, the acylated secondary amino group can be in the diazo and/or in the coupling component. Those new dyestuffs are preferred, however, which contain only one acylated secondary amino group.

Diazo components usable according to the present invention are obtained for example from N-monoalkyl-p-aminophenols by nitrating in concentrated mineral acids, acylating the 4-hydroxy-3-nitro-1-alkylaminobenzene compounds obtained and reducing the nitro group or one of the nitro groups in o-position to the hydroxyl group to the amino group. Also the 4-amino-2-nitro-1-halogen benzene compounds can be acylated with sulphonic acid halides, and the alkali salts of the sulphamide compound alkylated in inert solvents, the halogen exchanged with aqueous alkali for the hydroxyl group and the nitro group reduced to the amino group. In addition, 4-substituted 2-alkylamino-1-hydroxybenzene compounds can be acylated, any acyloxy groups present being saponified under mild conditions, the hydroxybenzene compound is nitrated in the o-position to the hydroxyl group and the nitro group is reduced so that 4-substituted 6-acyl-N-alkyl-amino-2-amino-1-hydroxybenzene compound is obtained. Further substituents, e.g. halogen, alkyl, alkoxy, nitro, acylamino, alkyl or aryl sulphonyl groups can also be present. Thus, for example 4-acyl-N-methylamino- or -ethylamino-2-amino-1-hydroxybenzene, 6-chloro-, 6-methyl- or 6-nitro-4 - acyl - N-methylamino- or -ethylamino-2-amino-1-hydroxybenzene, 6-acyl-N-methylamino- or -ethylamino-4-chloro-2-amino-1-hydroxybenzene, 6-acyl-N-methylamino- or -ethylamino-4-nitro-2-amino-1-hydroxybenzene, 6-acyl-N-methylamino- or -ethylamino-4-methyl sulphonyl-2 - amino-1-hydroxybenzene, 6-acyl-N-methylamino-4-butyl sulphonyl-2-amino-1-hydroxybenzene are obtained in which the acyl radical can be with advantage the acetyl or the methyl sulphonyl group, but possibly also a higher fatty acid radical, a benzoyl, furoyl, benzene or toluene sulphonyl radical, the remarks above regarding water solubility also holding good here.

Coupling components which contain acylated secondary amino groups according to the present invention are obtained for example from the acyl-N-alkylamino-aminobenzenes which can also contain halogen, alkyl, alkoxy, alkyl sulphonyl groups etc. as further ring substituents, by reacting with acylacetic acid esters or diketene to form acylacetic acid phenylamides. They can also be obtained by diazotisation and reduction of the diazo group to the hydrazino group and condensation with acylacetic acid esters or with diketene to form the corresponding 1-phenyl-5-pyrazolones. Also 4-alkyl-2- or -3-acyl-N-alkyl-amino-1-hydroxybenzenes can be used which can be produced from the corresponding amino compounds, e.g. by O.N-diacylation with alkyl sulphonyl halides, alkylation and saponification of the acyloxy to the hydroxyl group. Finally, also acyl-N-alkylamino-hydroxynaphthalene compounds can be used as coupling components, which compounds couple in the o-position to the hydroxyl group. They are obtained, e.g. from the corresponding N-alkyl-aminonaphthalene sulphonic acids by way of the alkali melt and acylation, any acyloxy groups present being saponified under mild conditions to hydroxyl groups. Finally, the acylated secondary amino group can also be in the acyl radical of an amino group, such as e.g. in the m- or p-acyl-N-alkylamino benzoyl radical. Examples of coupling components with the acylated secondary amino group according to the present invention are: aceto-acetic acid-2-, -3- or -4-acyl-N-methylamino phenylamide, 1-(3'- or 4' - acyl - N-methylamino-phenyl)-3-methyl-5-pyrazolone, 4-methyl-3- or -2-acyl-N-methylamino-1-hydroxybenzene, 4-acyl-N-methylamino-1-hydroxybenzene, 1- or -2- or -3-acyl-N-methylamino-7-hydroxynaphthalene, 1-(3'- or 4' - acyl - N-methylaminobenzoylamino)-7-hydroxynaphthalene, 4-chloro- or 4-methyl-3-acyl-N-methyl-amino-1-hydroxybenzene. The aromatic rings of these coupling components may also possibly contain the usual non-ionogenic substituents. Preferably an acetyl or a methyl sulphonyl radical is present as acyl radical; as has already been mentioned, possibly also higher aliphatic or aromatic carboxylic or sulphonic acid radicals may be present.

Naturally, all diazo or azo components usual in unsulphonated metal containing dyestuffs can be used with these diazo or coupling components, e.g. o-aminophenols, o-amino - methoxybenzenes, o-aminocarboxy benzenes which can further contain e.g. halogen, alkyl, alkoxy, nitro, acylamino, sulphonic acid amide, alkyl or aryl sulphonyl substituents, or acylacetic acid phenylamides, 5-pyrazolones such as 3-methyl-5-pyrazolone, 1-alkyl and, preferably, 1-phenyl-5-pyrazolones, phenols and naphthols coupling in the o-position to the hydroxyl group and aminobenzene or aminonaphthalene compounds coupling in the o-position to an amino group which can also be further substituted in the aromatic rings by the usual non-ionogenic substituents.

The new water soluble dyestuffs dye wool according to the single bath chroming method and the particularly valuable new chromium and cobalt containing water soluble dyestuffs dye wool, silk, casein fibres, superpolyamide and superpolyurethane fibres in a neutral to weakly acid bath in yellow, orange, red, brown, olive to grey shades according to their composition. The dyeings are very fast to wet and light. These dyestuffs as well as the metal containing monoazo dyestuffs according to the present invention which have insufficient water solubility dye lacquers composed chiefly of nitro or acetyl cellulose as well as acetyl cellulose spinning solutions in corresponding very fast to light shades.

The following examples illustrate the invention. Where not otherwise expressly stated, parts are given as parts by weight. The temperatures are in degrees centigrade. The relationship of parts by weight to parts by volume is as that of kilogrammes to litres.

EXAMPLE 1

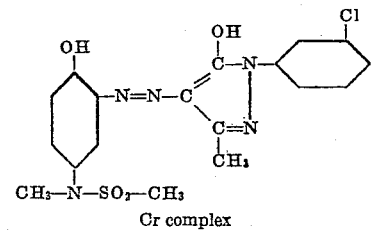

Cr complex 21.6 parts of 2-amino-4-methyl sulphonyl-methylamino-1-hydroxybenzene are dissolved in 100 parts of water with 20 parts of concentrated hydrochloric acid and diazotised at 0–5° with 20 parts by volume of 5 N-sodium nitrite solution. After neutralising with sodium bicarbonate, the diazo compound is poured into a solution of 21.9 parts of 1-(3'-chlorophenyl)-3-methyl-5-pyrazolone and 4.2 parts of sodium hydroxide in 200 parts of water which has been cooled with ice to 0°. On completion of the coupling, the precipitated dyestuff is filtered off and dried. The dyestuff obtained is boiled for some hours under reflux in 300 parts of water with 220 parts of a solution of sodium chromosalicylate (corresponding to 2.86 parts of Cr) until the starting dyestuff has disappeared. The reaction is then made alkaline by the addition of caustic soda lye and the precipitated crystal mass is filtered off, washed with a little water and dried. Dispersing agents and salts having an alkaline reaction such as sodium carbonate can be mixed in to improve the solubility. When dry, the complex chromium compound is a brown powder which dyes wool both from a weakly alkaline as well as from a neutral or weakly acid bath in orange-red shades. The dyeings have good fastness to light and very good fastness to milling, perspiration and alkali.

Dyestuffs having a similar behaviour on dyeing are attained if instead of 2-amino-4-methyl sulphonyl-methylamino-1-hydroxy-benzene, 18.0 parts of 2-amino-4-acetylmethylamino-1-hydroxybenzene, 23.0 parts of 2-amino-4-methyl sulphonyl-ethylamino-1-hydroxybenzene, or 23.0 parts of 2-amino-4-ethyl sulphonyl methylamino-1-hydroxybenzene are used.

The diazo components mentioned above are obtained as follows:

4-monoalkylamino-1-phenol is nitrated in sulphuric acid monohydrate to 2-nitro-4-monoalkylamino-1-phenol, this is acylated to 2-nitro-4-acylmonoalkylamino-1-phenol and the compound obtained is reduced.

EXAMPLE 2

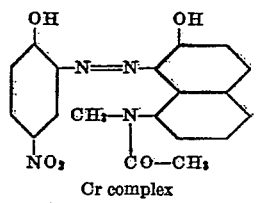

Cr complex 15.4 parts of 4-nitro-2-amino-1-phenol are pasted in 100 parts of water and 18 parts of concentrated hydrochloric acid and diazotised at 0–5° with 20 parts by volume of 5 N-sodium nitrite solution. The diazo compound is then neutralised with sodium bicarbonate and poured into an ice cold solution of 22.6 parts of 1-acetylmethylamino-7-naphthol, 4.2 parts of sodium hydroxide and 15 parts of anhydrous sodium carbonate in 300 parts of water. On completion of the coupling, the dyestuff is precipitated with sodium chloride and filtered off. It is then pasted in 300 parts of water and boiled under reflux with 220 parts by volume of a solution of sodium chromosalicylate (corresponding to 2.86 parts of Cr) until the starting dyestuff has disappeared. The chromium containing dyestuff is precipitated by the addition of sodium chloride, filtered off and dried. It is a brown-black powder which dyes wool from a neutral or weakly acid bath in violet-brown shades which have excellent fastness to light and very good wetfastness properties.

Dyestuffs with similar properties are obtained if instead of 1-acetylmethylamino-7-naphthol, 24.3 parts of 1-carbomethoxymethylamino-7-naphthol, 26.5 parts of 1-methyl sulphonyl-methylamino-7-naphthol or 24.1 parts of 1-propionylmethylamino-7-naphthol are used.

The acylmethylamino naphthols mentioned are obtained in the following manner. Naphthyl amino sulphonic acid-(1.7) is acylated with toluene sulphochloride to form 1-toluene sulphonyl aminonaphthalene sulphonic acid-(7), this is methylated with dimethyl sulphate, the resulting compound is saponified with 70% sulphuric acid to form 1-methylaminonaphthalene-7-sulphonic acid and this is converted by way of the alkali melt at 250° into 1-methylamino-7-naphthol. This is then acylated by the usual methods.

EXAMPLE 3

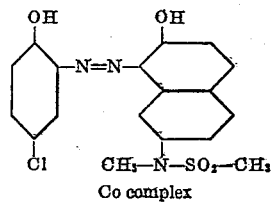

Co complex 14.4 parts of 4-chloro-2-amino-1-phenol are dissolved in 200 parts of water with 18 parts of concentrated hydrochloric acid and, after the addition of ice, diazotised. The diazonium solution is neutralised with sodium bicarbonate solution and poured into a solution of 26.5 parts of 2-methyl sulphonyl-methylamino-7-hydroxynaphthalene, 4.2 parts of sodium hydroxide and 15 parts of anhydrous sodium carbonate in 200 parts of water. The whole is stirred at 0–5° until the dyestuff formation is complete. The dyestuff is then separated by the addition of sodium chloride, filtered off and pasted in 500 parts of water. 20 parts of tartaric acid and 100 parts of a solution of cobalt acetate (corresponding to 3.3 parts of Co) are added and the whole is heated for 10 hours at 80°. 10 N-caustic soda lye is then added until the reaction is alkaline to mimosa paper, heated for half an hour at 80°, sodium chloride is added and the cobalt containing dyestuff is filtered off. When dry, it is a wine red powder which dyes wool from a neutral or weakly acetic acid bath in ruby red shades which have very good fastness to light, washing and milling.

2-methyl sulphonyl methylamino-7-hydroxynaphthalene is produced as follows. 2-naphthol-7-sulphonic acid is converted according to Bucherer into 2-methylaminonaphthalene-7-sulphonic acid, this is melted with alkali to form 2-methylamino-7-hydroxynaphthalene and then it is acylated with methyl sulphochloride.

EXAMPLE 4

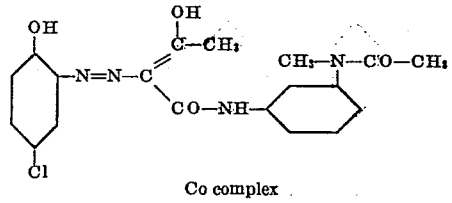

Co complex 14.4 parts of 4-chloro-2-amino-1-phenol are diazotised as described in Example 3 and after neutralising, are poured into a solution of 25.2 parts of acetoacetic acid-(3'-acetylmethylamino)-anilide and 15 parts of anhydrous sodium carbonate in 300 parts of water. On completion of the dyestuff formation, sodium chloride is added and the dyestuff is filtered off. The damp filter cake is pasted in 500 parts of water, 20 parts of tartaric acid are added, it is heated to 75°, 100 parts of a solution of cobalt acetate (corresponding to 3.3 parts of Co) are added, a 10% by volume sodium carbonate solution is slowly added dropwise until the reaction is alkaline to brilliant yellow paper and then the whole is stirred at 75° until the metallisation is complete. The cobalt containing dyestuff is precipitated with sodium chloride, filtered off and dried. It is a yellow-brown powder which dyes wool from a neutral or acetic acid bath in golden yellow shades which have very good fastness properties.

Dyestuffs with very similar properties are obtained if instead of acetoacetic acid-(3'-acetylmethylamino)-anilide, acetoacetic acid-(4'- or -2'-acetylmethylamino)-anilide is used. These acetoacetic acid anilides are produced by reacting diketene with the corresponding acetylmethylamino anilines.

EXAMPLE 5

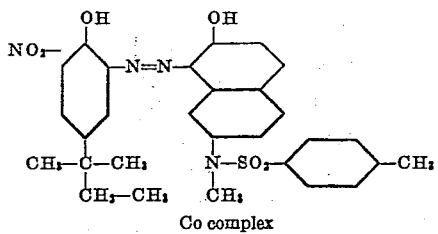
Co complex 22.4 parts of 6-nitro-2-amino-4-tert. amyl-1-phenol are diazotised in the usual way, the diazonium compound is neutralised with sodium bicarbonate and is poured at 0–3° into a solution of 32.7 parts of 2-p-toluene sulphomethylamino-7-hydroxynaphthalene, 4.2 parts of sodium hydroxide and 15 parts of anhydrous sodium carbonate in 300 parts of water. On completion of the dyestuff formation, the dyestuff is filtered off, washed with a little water and dried. The dry dyestuff is heated at 100° in 400 parts of formamide with 13 parts of cobalt acetate (corresponding to 3.3 parts of Co) until the starting dyestuff has disappeared. A violet-red solution is obtained which is poured while still hot into 4000 parts of water and 50 parts of concentrated hydrochloric acid. The metal containing dye acid precipitates out completely. It is filtered off, washed with water, pasted in 200 parts of water and, after the reaction has been made alkaline with caustic soda lye, it is heated for half an hour at 70°. The precipitated sodium salt of the cobalt complex is filtered off, washed with water and dried. It is a black-brown powder which dissolves well in acetone and produces red-violet Zapon varnish dyeings which have good fastness properties.

A dyestuff with similar properties is obtained if, instead of 2-p-toluene sulphomethylamino-7-hydroxynaphthalene, 29.1 parts of 2-benzoylmethylamino-7-hydroxynaphthalene are used.

EXAMPLE 6

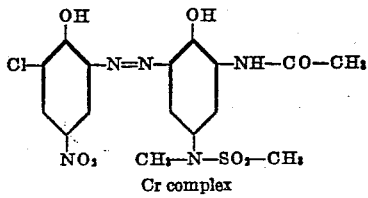
Cr complex 18.9 parts of 6-chloro-4-nitro-2-amino-1-phenol are pasted in 50 parts of water and 18 parts of concentrated hydrochloric acid and diazotised at 0–3° with 20 parts by volume of 5 N-sodium nitrite solution. The reaction is made neutral with sodium carbonate and an ice cold solution of 27.2 parts of 4-methyl sulphonylmethylamino-2-acetylamino-1-phenol, 4.2 parts of sodium hydroxide and 18 parts of anhydrous sodium corbonate in 100 parts of water is added and then the whole is diluted with 70 parts by volume of pyridine. On completion of the coupling it is diluted with 1000 parts of ice water, acidified with concentrated hydrochloric acid, the precipitated dyestuff is filtered off and washed thoroughly with cold water. It is then dissolved in 400 parts of water and 30 parts of sodium carbonate, precipitated with sodium chloride, filtered off and washed with diluted sodium chloride solution and dried. In this way a black powder is obtained which dyes wool according to the single bath process or the after chroming process in full, brown shades which have very good fastness to light.

To convert into the chromium complex, 48 parts of the dry dyestuff in 400 parts of water are boiled for 15 hours with 220 parts of a solution of sodium chromosalicylate. Sufficient sodium chloride is then added to completely precipitate the chromium containing dyestuff, the dyestuff is filtered off and dried. It is a black-brown powder which dissolves well in hot water and dyes wool from an acetic acid bath in full, brown shades which have very good fastness to light, alkali and milling.

EXAMPLE 7 mixed Cr complex

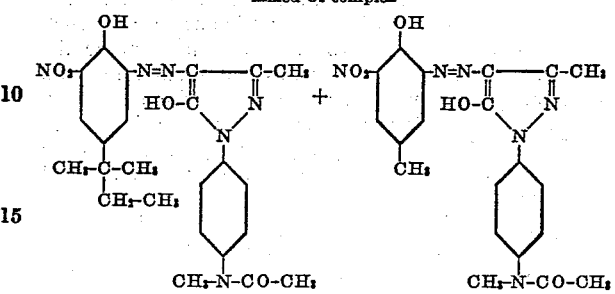

11.2 parts of 6-nitro-2-amino-4-tert. amyl-1-phenol and 8.4 parts of 6-nitro-2-amino-p-cresol are diazotised in the usual way and mixed. After neutralising with sodium bicarbonate, the mixture is poured into a solution of 25.7 parts of 1-(4'-acetyl-methylamino)-phenyl-3-methyl-5-pyrazolone and 20 parts of anhydrous sodium carbonate in 300 parts of water and the whole is stirred at 0–3° until the coupling is complete. The dyestuff is then filtered off, pasted in 500 parts of water, 220 parts of a solution of ammonium chromosalicylate (corresponding to 2.86 parts of Cr) and 50 parts of Turkey red oil are added and the whole is boiled until the metallisation is complete. The chromium containing dyestuff is then precipitated by the addition of sodium chloride, filtered off and dried. It is a red powder which dissolves well in water after being mixed with trisodium phosphate. It dyes wool from a neutral or weakly acetic acid bath in very fast to light red shades.

EXAMPLE 8

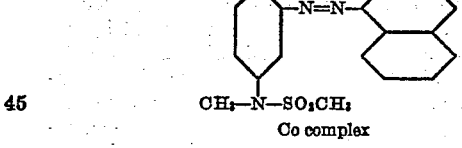
Co complex 21.6 parts of 2-amino-4-methyl sulphonyl-methylamino-1-hydroxybenzene are diazotised as described in Example 1 and poured into a solution of 15.1 parts of 2-aminonaphthalene in 100 parts of glacial acetic acid. The whole is warmed to 10°, 10 parts of crystallised sodium acetate are slowly added and the temperature is kept at 10° until the dyestuff formation is complete. It is then poured into 1000 parts of water, neutralised with caustic soda lye, the precipitated dyestuff is filtered off, washed with water and dried. It is an orange powder. To cobalt, it is suspended in 300 parts of ethyl alcohol, 50 parts by volume of 2 molar tartaric acid solution and 100 parts by volume of 10 N-caustic soda lye are added, it is heated to 70° and 50 parts of cobalt acetate solution (corresponding to 3.0 parts of Co) are added. The whole is then boiled for 3 hours, evaporated to dryness, the residue is taken up in 200 parts of hot water and the cobalt containing dyestuff is precipitated with sodium chloride. After filtering and drying, it is a grey-black powder which dissolves in hot water with a violet grey colour and dyes wool from a neutral or weakly acid bath in fast, lead-grey shades.

Dyestuffs with very similar properties are obtained if instead of 15.1 parts of 2-aminonaphthalene, 23 parts of 6-bromo-2-aminonaphthalene or 18.1 parts of 7-methoxy-2-aminonaphthalene are used.

Other dyestuffs produced according to the above process are given in the following table.

Table

| No. | Diazo component | Coupling component | Metal | Shade on wool |
|---|---|---|---|---|
| 1 | 2-amino-4-nitrophenol (OH, NH₂, NO₂) | HO-naphthalene-N(CH₃)-CO-CH₃ | Cr | Brown. |
| 2 | 2-amino-4-nitrophenol | HO-naphthalene-N(CH₃)-CO-CH₃ | Co | Brownish-red. |
| 3 | 2-amino-4-chlorophenol (OH, NH₂, Cl) | HO-naphthalene-N(CH₃)-CO-CH₃ | Cr | Violet. |
| 4 | 2-amino-4-chlorophenol | HO-naphthalene-N(CH₃)-CO-CH₃ | Co | Violet-red. |
| 5 | 2-amino-4-methylsulfonylphenol (OH, NH₂, SO₂CH₃) | HO-naphthalene-N(CH₃)-CO-CH₃ | Cr | Brown-violet. |
| 6 | 2-amino-4-nitrophenol | naphthalene with CH₃-N-COCH₃ and HO | Co | Red-brown. |
| 7 | 2-amino-4-chlorophenol | naphthalene with CH₃-N-COOCH₃ and HO | Co | Violet-red. |
| 8 | 2-amino-4-chlorophenol | HO-naphthalene-N(CH₃)-COCH₃ | Co | Red-violet. |
| 9 | 2-amino-4-methylsulfonylphenol | HO-naphthalene-N(CH₃)-COCH₃ | Cr | Violet-grey. |

Table—Continued

| No. | Diazo component | Coupling component | Metal | Shade on wool |
|---|---|---|---|---|
| 10 | 2-amino-4-methyl-6-nitrophenol (OH, NH₂, NO₂, CH₃) | $CH_3-CO-CH_2-CO-NH-$⟨ring⟩$-CH_2-CO-N-CH_3$ | Co | Orange. |
| 11 | 2-amino-4-nitrophenol | $CH_3-CO-CH_2-CO-NH-$⟨ring⟩$-CH_2-CO-N-CH_3$ | Co | Red-orange. |
| 12 | 2-amino-3-methyl-5-nitrophenol | $CH_3-CO-CH_2-CO-NH-$⟨ring⟩$-CH_2-CO-N-CH_3$ | Co | Reddish-yellow. |
| 13 | 2-amino-5-nitrophenol | $CH_3-CO-CH_2-CO-NH-$⟨ring⟩$-CH_2-CO-N-CH_3$ | Co | Yellow. |
| 14 | 2-amino-4-chloro-6-nitrophenol | $CH_3-CO-CH_2-CO-NH-$⟨ring⟩$-CH_2-CO-N-CH_3$ | Co | Brownish orange. |
| 15 | 2-amino-4-(sec-butyl)-6-nitrophenol | pyrazolone coupler with $-N-CO-CH_3$, $CH_3$ on ring | Cr | Red. |
| 16 | 2-amino-4-nitrophenol | pyrazolone coupler with $-N-CO-CH_3$, $CH_3$ on ring | Cr | Orange. |
| 17 | 2-amino-4-nitrophenol | pyrazolone coupler with $-N-CO-CH_3$, $CH_3$ on ring | Co | Brownish yellow. |

Table—Continued

| No. | Diazo component | Coupling component | Metal | Shade on wool |
|---|---|---|---|---|
| 18 | 4-(CH₃-N-SO₂CH₃)-2-amino-phenol | 2-naphthol | Cr | Violet. |
| 19 | 4-(CH₃-N-SO₂CH₃)-2-amino-phenol | 2-naphthol | Co | Ruby red. |
| 20 | 4-(CH₃-N-SO₂CH₃)-2-amino-phenol | 1,4-dichloro-8-hydroxy-naphthalene | Cr | Navy blue. |
| 21 | 4-(CH₃-N-SO₂CH₃)-2-amino-phenol | 1-acetylamino-7-hydroxy-naphthalene | Cr | Grey. |
| 22 | 4-(CH₃-N-SO₂CH₃)-2-amino-phenol | 1-(methoxycarbonylamino)-7-hydroxy-naphthalene | Cr | Greenish-grey. |
| 23 | 4-nitro-2-amino-phenol | 1-[(3-(CH₃-N-SO₂CH₃)-cyclohexyl)-carbonylamino]-7-hydroxy-naphthalene | Cr | Do. |
| 24 | 4-chloro-2-amino-phenol | 1-[(3-(CH₃-N-SO₂CH₃)-cyclohexyl)-carbonylamino]-7-hydroxy-naphthalene | Cr | Blue-grey. |
| 25 | 4-nitro-2-amino-phenol | 4-(CH₃-N-SO₂-CH₃)-2-(NH-CO-CH₃)-phenol | Cr | Brown. |
| 26 | 4-nitro-2-amino-phenol | 4-(CH₃-N-SO₂-CH₃)-2-(NH-CO-CH₃)-phenol | Co | Red-brown. |

Table—Continued

| No. | Diazo component | Coupling component | Metal | Shade on wool |
|---|---|---|---|---|
| 27 | 2-amino-4-chlorophenol | N-isopropyl-6-hydroxy-2-naphthamide (HO–naphthalene–N(CO–CH₃)(CH(CH₃)₂)) | Co | Ruby red. |
| 28 | 2-amino-4-(N-ethyl-methanesulfonamido)phenol | 1-phenyl-3-methyl-5-pyrazolone | Co | Orange-yellow. |
| 29 | 2-amino-4-(N-methyl-methanesulfonamido)phenol | 1-(3,4-dichlorophenyl)-3-methyl-5-pyrazolone-4-carboxamide | Cr | Red. |
| 30 | 2-amino-4-(N-methyl-methanesulfonamido)phenol | 1-(N-methyl-methanesulfonamido)-7-hydroxynaphthalene | Cr | Violet. |
| 31 | 2-amino-4-(N-methyl-methanesulfonamido)phenol | 6-hydroxy-naphthalene-2-sulfonamide | Cr | Do. |
| 32 | 2-amino-4-[N-methyl-(p-toluenesulfonyl)amino]phenol | 1-hydroxy-naphthalene-N-methylsulfonamide | Co | Yellowish bordeaux. |
| 33 | anthranilic acid (2-aminobenzoic acid) | 1-(4-acetamidophenyl)-3-methyl-5-pyrazolone | Cr | Yellow. |

Table—Continued

| No. | Diazo component | Coupling component | Metal | Shade on wool |
|---|---|---|---|---|
| 34 | 2-amino benzoic acid (COOH, NH₂) | pyrazolone with N-methyl, N-acetyl substituted phenyl | Cr | Greenish yellow. |
| 35 | 2-amino-4-(ethylsulfonyl)phenol | 2-hydroxy-6-(N-methyl-methanesulfonamido)naphthalene | Co | Bordeaux red. |
| 36 | 2-amino-4-(ethylsulfonyl)phenol | 2-hydroxy-6-(N-methyl-methoxycarbonylamino)naphthalene | Co | Do. |
| 37 | 2-amino-4-(ethylsulfonyl)phenol | 2-hydroxy-6-[N-methyl-N-(2-methoxyethoxycarbonyl)amino]naphthalene | Co | Do. |
| 38 | 2-amino-4-(N-methyl-methanesulfonamidomethyl)phenol | 1-(N-methyl-methanesulfonamido)-7-hydroxynaphthalene | Co | Do. |
| 39 | 2-amino-4-(N-methyl-methanesulfonamidomethyl)phenol | pyrazolone with N-methyl, N-acetyl substituted phenyl | Cr | Orange. |
| 40 | 2-amino-4-(N-methyl-methanesulfonamidomethyl)phenol | 2-hydroxy-6-(N-methyl-methanesulfonamido)naphthalene | Co | Bordeaux red. |
| 41 | 2-amino benzoic acid (COOH, NH₂) | 2-hydroxy-6-(N-methyl-methoxycarbonylamino)naphthalene | Cr | Reddish brown. |
| 42 | 2-amino-4-(N-acetyl-N-phenyl)amino phenol | 2-hydroxynaphthalene | Co | Bordeaux red. |

Table—Continued

| No. | Diazo component | Coupling component | Metal | Shade on wool |
|---|---|---|---|---|
| 43 | 2-amino-4-(N-acetyl-N-phenylamino)phenol (OH, NH$_2$, N(COCH$_3$)-phenyl) | 1-phenyl-3-methyl-5-pyrazolone | Cr | Orange. |
| 44 | 2-amino-4-chlorophenol | 2-(N-acetyl-N-butylamino)-7-hydroxynaphthalene (HO—naphthyl—N(COCH$_3$)CH$_2$CH$_2$CH$_2$CH$_3$) | Cr | Violet. |
| 45 | 2-amino-4-(N-methyl-N-ethylsulfonylamino)phenol (OH, NH$_2$, CH$_3$–N–SO$_2$C$_2$H$_5$) | 1-phenyl-3-methyl-5-pyrazolone | Cr | Orange. |
| 46 | 2-amino-4-[N-methyl-N-(methoxyethoxycarbonyl)amino]phenol (OH, NH$_2$, CH$_3$–N–COOC$_2$H$_4$–OCH$_3$) | 1-phenyl-3-methyl-5-pyrazolone | Co | Reddish yellow. |
| 47 | 2-amino-4-(N-methyl-N-methylsulfonylamino)phenol (OH, NH$_2$, CH$_3$–N–SO$_2$CH$_3$) | 1-(ethoxycarbonylamino)-7-hydroxynaphthalene (HO—naphthyl—NHCOOC$_2$H$_5$) | Cr | Greenish grey. |
| 48 | 2-amino-4-(N-methyl-N-methylsulfonylamino)phenol (OH, NH$_2$, CH$_3$–N–SO$_2$CH$_3$) | 1-(ethoxycarbonylamino)-7-hydroxynaphthalene (HO—naphthyl—NHCOOC$_2$H$_5$) | Co | Grey-violet. |
| 49 | 2-amino-4-nitrophenol | 1-(N-methyl-N-propionylamino)-7-hydroxynaphthalene (HO—naphthyl—N(CH$_3$)COCH$_2$CH$_3$) | Co | Brown-red. |
| 50 | 2-amino-3-chloro-5-nitrophenol | 4-(acetylamino)-2-hydroxy-(N-methyl-N-benzoylamino)benzene (OH, NHCOCH$_3$, CH$_3$–N–CO—phenyl) | Cr | Brown. |

EXAMPLE 9

0.2 part of the metal containing dyestuff according to Example 1 is dissolved in 400 parts of water. 10 parts of wool are entered at 50°, 0.5 part of ammonium acetate are added, the bath is brought to the boil within 45 minutes and is boiled while moving the wool well for 1½ hours, after which the wool is rinsed and dried. The wool which has been so dyed in grey shades is distinguished by very good fastness properties.

The dyestuffs according to Examples 2–8 and in the table can be dyed in a similar manner.

What we claim is:

1. The complex chromium compound which contains one atom of chromium bound in complex union to two molecules of a dyestuff of the formula

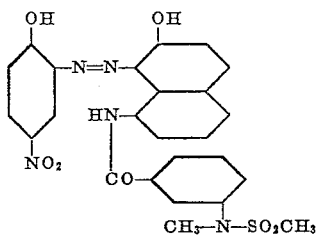

2. The complex cobalt compound which contains one atom of cobalt bound in complex union to two molecules of a dyestuff of the formula

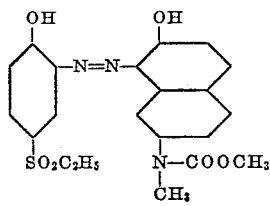

3. The complex cobalt compound which contains one atom of cobalt bound in complex union to two molecules of a dyestuff of the formula

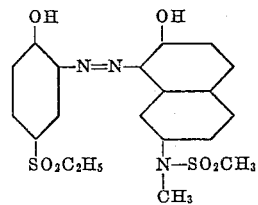

4. The complex cobalt compound which contains one atom of cobalt bound in complex union of two molecules of a dyestuff of the formula

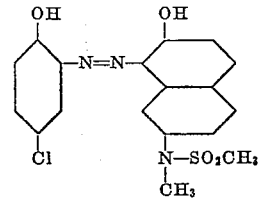

References Cited in the file of this patent

UNITED STATES PATENTS

| | | |
|---|---|---|
| 2,437,645 | Long et al. | Mar. 9, 1948 |
| 2,673,199 | Widmer et al. | Mar. 23, 1954 |
| 2,738,345 | Schetty | Mar. 13, 1956 |

FOREIGN PATENTS

| | | |
|---|---|---|
| 1,095,561 | France | Dec. 22, 1954 |
| 1,097,932 | France | Feb. 23, 1955 |